(12) United States Patent
Meng et al.

(10) Patent No.: US 11,194,827 B2
(45) Date of Patent: Dec. 7, 2021

(54) METHOD OF STORING REMOTE SENSING BIG DATA IN HBASE DATABASE

(71) Applicant: Wuhan University, Wuhan (CN)

(72) Inventors: Lingkui Meng, Wuhan (CN); Changlu Cui, Wuhan (CN); Wen Zhang, Wuhan (CN); Yizhuo Meng, Wuhan (CN); Yisong Wang, Wuhan (CN); Rui Wang, Wuhan (CN); Beibei Yang, Wuhan (CN); Ziwen Gao, Wuhan (CN); Linyi Li, Wuhan (CN); Changhui Yu, Wuhan (CN); Chongxin Tao, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 89 days.

(21) Appl. No.: 16/729,244

(22) Filed: Dec. 27, 2019

(65) Prior Publication Data

US 2020/0210421 A1 Jul. 2, 2020

(30) Foreign Application Priority Data

Dec. 29, 2018 (CN) .......................... 201811639288.1

(51) Int. Cl.
*G06F 16/2458* (2019.01)
*G06F 16/28* (2019.01)
*G06F 16/22* (2019.01)
*G06T 7/40* (2017.01)
*G06T 7/70* (2017.01)
*G06T 3/40* (2006.01)

(52) U.S. Cl.
CPC ........ *G06F 16/2465* (2019.01); *G06F 16/221* (2019.01); *G06F 16/2282* (2019.01); *G06F 16/283* (2019.01); *G06T 3/4053* (2013.01); *G06T 7/40* (2013.01); *G06T 7/70* (2017.01)

(58) Field of Classification Search
CPC . G06F 16/2282; G06F 16/2465; G06F 16/283
USPC ............................................. 707/739; 435/29
See application file for complete search history.

(56) References Cited

U.S. PATENT DOCUMENTS 9,721,375 B1 * 8/2017 Rivard ...................... G06T 3/60
2013/0183707 A1 * 7/2013 Mangoubi .............. G16B 40/00
435/29
2020/0057914 A1 * 2/2020 Hintz .................... G06F 16/587

* cited by examiner

*Primary Examiner* — Hung T Vy
(74) *Attorney, Agent, or Firm* — JCIP Global Inc.

(57) ABSTRACT

A method of storing remote sensing big data in a Hbase database. The method includes: obtaining a remote sensing image, and pre-cropping the remote sensing image based on a Google S2 algorithm; selecting a grid level based on a resolution of the remote sensing image; demarcating a coverage scope of the remote sensing image; calculating grids covered within the coverage scope; cropping the remote sensing image according to the grids, to yield a plurality of image blocks, and serializing the plurality of image blocks; establishing an Hbase table; establishing a table storage model containing RowKey, and calculating the RowKey according to attributes of an image block; and integrating data structure of multi-source remote sensing image data according to attribute expression of a zoned remote sensing image in a plurality of dimensions, and storing serialized image blocks in an Hbase database according to the RowKey.

11 Claims, 7 Drawing Sheets

| RowKey | Time Stamp | CF: Query Conditions | | CF: GEOimage information | |
|---|---|---|---|---|---|
| A standardized structure of the RowKey is as follows: each RowKey is composed of 24 bytes, where eight bytes represent an ID of an S2 grid, eight bytes represent photographing time information of an image, two bytes represent a satellite ID, two bytes represent a sensor ID and four bytes represent a unique number of the image in this series of products. | | productID | | header information | |
| | | sceneID | | Band1 information | |
| | | FileName | | Band2 information | |
| | | XmlName | | Band3 information | |
| | | Satellite | | Band4 information | |
| | | Sensor | | Band5 information | |
| | | centerTime | | Memo | |
| | | band name | | | |
| | | grid level | | | |
| | | GridID | | | |
| | | ImageResolution | | | |
| | | Cloud level | | | |

FIG. 2

METHOD OF STORING REMOTE SENSING BIG DATA IN HBASE DATABASE

CROSS-REFERENCE TO RELATED APPLICATIONS

Pursuant to 35 U.S.C. § 119 and the Paris Convention Treaty, this application claims foreign priority to Chinese Patent Application No. 201811639288.1 filed Dec. 29, 2018, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to the technical field of remote sensing image management, and more particularly to a method of storing remote sensing big data in a Hbase database based on Google S2 algorithm.

Remote sensing data features massiveness, multiple source, heterogeneity and distributed storage. The storage management manner of remote sensing data mainly includes three manners, i.e., a database management manner, a file-based management manner and a hybrid management manner based on file and database. In the traditional management manners, the remote sensing images exist in the form of file, which is not conducive to management and distribution of image data.

Meanwhile, remote sensing images are obtained in different ways, and data formats of the remote sensing images are diversified. Most database-based remote sensing image management systems do not have a unified standard for storing various types of data with data formats, types and numbers being different, which increases development costs and construction periods of the system.

The traditional data management manner in the form of metadata plus image files becomes increasingly inapplicable to the massive data. The defects include: the data is provided in a single manner, the data management accuracy is not sufficient; a plurality of users need to perform the same pre-processing operation for the same data and cannot share the data; a large amount of invalid information exists in one data transmission, leading to waste of bandwidth resources; satellite data of the same type across a satellite system cannot be used in a same layer; information cannot be directly recovered to a corresponding spatial region after data analysis and it is required to establish another database for management.

SUMMARY

The disclosure provides a method of storing remote sensing big data in a Hbase database based on Google S2 algorithm. The method comprises:
  obtaining a remote sensing image, and pre-cropping the remote sensing image based on a Google S2 algorithm; selecting a grid level based on a resolution of the remote sensing image; demarcating a coverage scope of the remote sensing image; calculating grids covered within the coverage scope; cropping the remote sensing image according to the grids, to yield a plurality of image blocks, and serializing the plurality of image blocks; and
  establishing an Hbase table, wherein a plurality of remote sensing images acquired by one satellite corresponds to one Hbase table, and naming the Hbase table with a name of the one satellite and its corresponding sensor name; establishing a table storage model containing RowKey, and calculating the RowKey according to attributes of an image block; and integrating data structure of multi-source remote sensing image data according to attribute expression of a zoned remote sensing image in a plurality of dimensions in a manner of data band discrete storage, and storing serialized image blocks in an Hbase database according to the RowKey.

Cropping the remote sensing image comprises mapping between multi-level grids of Google S2 and resolutions of different remote sensing images: when the resolution of the remote sensing image is 60 meters, a cropping grid level corresponding to Google S2 is level 9; when the resolution of the remote sensing image is 30 meters, a cropping grid level corresponding to Google S2 is level 10; when the resolution of the remote sensing image is in a range of 20-10 meters, a cropping grid level corresponding to Google S2 is level 11; when the resolution of the remote sensing image is in a range of 8-5 meters, a cropping grid level corresponding to Google S2 is level 12; when the resolution of the remote sensing image is in a range of 4-3.5 meters, a cropping grid level corresponding to Google S2 is level 13; when the resolution of the remote sensing image is in a range of 2.5-2 meters, a cropping grid level corresponding to Google S2 is level 14; when the resolution of the remote sensing image is 1 meter, a cropping grid level corresponding to Google S2 is level 15.

The coverage scope of a cropped remote sensing image is decided as follows:
  the coverage scope of a cropped remote sensing image is a maximum circumscribed rectangle of a Google S2 diamond grid; the coverage scope of the maximum circumscribed rectangle is greater than a scope of the Google S2 cropped diamond grid, so that a space of the Google S2 cropped diamond grid is entirely filled with the cropped remote sensing image to ensure saturated filling of a pixel for the diamond grid and realize spatial discretization of the remote sensing image.

The table storage model of the Hbase database comprises one RowKey, one Time Stamp, and two Columns Families.

The RowKey is configured to uniquely identify one row of records to realize positioning and expression of data.

The RowKey comprises 24 bytes, first eight bytes of which represent an ID of Google S2 grids; next four bytes represent a satellite id, short 2 bytes, and a sensor id, short 2 bytes, respectively; further next eight bytes represent a photographing time stamp of the remote sensing image; last four remaining bytes record a unique ID of the remote sensing image; the Rowkey compiles the attributes into different bytes to realize unique expression of multi-source spatial blocked image data.

Two Columns Families comprise Query Conditions Columns Family and GEOimage information Columns Family, and unified management of different remote sensing data information and unique expression of multi-source spatial blocked image data are realized by freely controlling a Column attribute information amount in the Column Families.

Two groups of Column Family information in the two Columns Families are the Query Conditions Columns Family recording a spatial description condition and the GEOimage information Columns Family recording image band and texture information, respectively.

The attributes of the Query Conditions Columns Family comprise: a remote sensing image satellite production ID, a product ID, an image source name, an image source description xml name, a source satellite, a source sensor, image photographing time, a band name, a grid level, a corresponding grid name, an image resolution, an image cloud amount, which are used to describe spatial information in a plurality of dimensions.

The attributes of the GEOimage information Columns Family comprise image header information attribute fields for describing image description recovery information; image ontology information is recorded in different data attribute fields in a band division manner, and each band is stored by using an independent attribute field; the number of attribute fields recording images is adjusted according to different image data attributes.

The method of storing remote sensing big data according embodiments of the disclosure has the following beneficial effects: the method comprises performing gridded cropping of the remote sensing image and establishing an Hbase database table storage model. The method utilizes features of different types of remote sensing images, realizes efficient storage of remote sensing big data, and satisfies requirements of users in different application scenarios. At the same time, the extendability and data balancing of the system are effectively considered.

BRIEF DESCRIPTION OF THE DRAWINGS

FIG. 2 is a schematic diagram of a database table according to one embodiment of the disclosure;

DETAILED DESCRIPTION OF THE EMBODIMENTS

Figure 1:
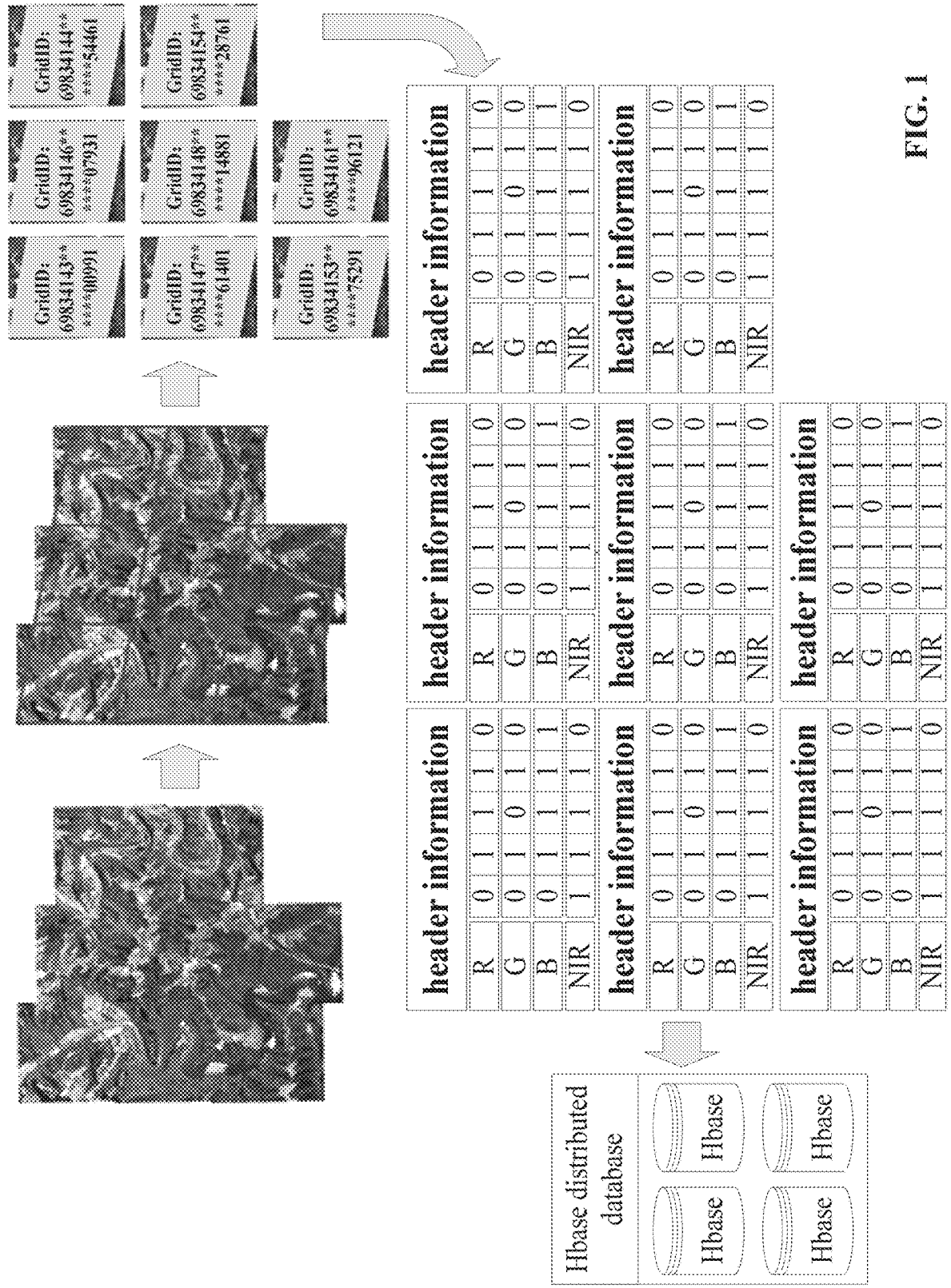
FIG. 1 is a flowchart of cropping a remote sensing image based on Google S2 algorithm according to one embodiment of the disclosure.
Figure 3:
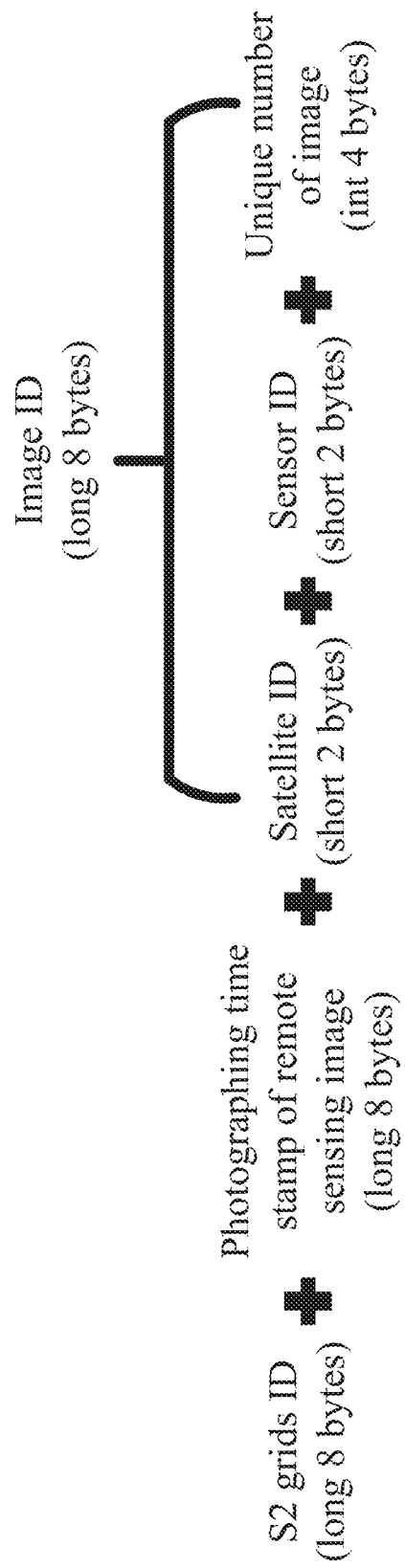
FIG. 3 is a schematic diagram of a RowKey according to one embodiment of the disclosure.

To further illustrate, embodiments detailing a method of storing remote sensing big data in a Hbase database based on Google S2 algorithm are described below. It should be noted that the following embodiments are intended to describe and not to limit the disclosure.

A method of storing remote sensing big data in a Hbase database based on Google S2 algorithm according to an example of the disclosure is applicable to all image structures comprised in a form of spatial description information+multi-layer band matrix, and facilitates multi-source heterogeneous high-resolution standardized and refined management. Thus, the method is a general method of storing and managing remote sensing image data, and specifically comprises gridded cropping of remote sensing data and establishment of an Hbase database table storage model.

A computing device comprising an image storage cluster (a cluster requires at least 4 servers, each serving as four nodes in the cluster, server configuration requirements (minimum): memory: 8G, processor: Intel Core i7-7700 @ 3.6 GHz, Hard disk: WDC WD 10EZEX-08WN4A0 1 TB 7200 rpm (considering the increase in the amount of subsequent data, the larger the hard disk, the better). It is required that four nodes are located in the same network segment, such as: 192.168.123. XX. Software environment required for HBase cluster The versions are as follows: Zookeeper 3.4.10, Hadoop 2.7.7, HBase 1.2.11, JDK 1.8, Centos 7) and the running server (the running server requires that the image storage cluster is on the same network segment, taking into account the data transmission between the servers, the bandwidth between the servers is as high as possible. Considering the subsequent high performance and high availability requirements, the higher the server configuration, the better. The server configuration requirements are as follows: memory: 32G, hard disk: WDC WD 10EZEX-08WN4A0 1 TB 7200 rpm, processor: Intel Core i7-7700 @ 3.6 GHz, basic software environment required: Idea, JDK 1.8, Win10).

The running server performs the following actions: reading the remote sensing image stored in the hard disk into memory by the processor, and pre-cropping the remote sensing image based on a Google S2 algorithm; selecting the grid level based on the resolution of the remote sensing image; determining the coverage range of the remote sensing image; calculating grids covered within the coverage range; cropping the remote sensing image according to the grids, to yield a plurality of image blocks, and serializing the plurality of image blocks;

establishing a distributed Hbase cluster in the memory of image storage cluster HBase, which is responsible for the storage management of the block image; creating an image management library; establishing a table storage model containing RowKey; using the table storage model in the image management library; calculating the RowKey according to transformation of multiple key attributes of image block; and integrate multi-source remote sensing image data according to attribute expression of block remote sensing image in a plurality of dimensions in a manner of data band discrete storage, and store serialized image blocks in Hbase database table column cluster according to the RowKey.

The gridded cropping of remote sensing data is used to perform zoning, slicing and ground spatial discretization for an entire large-scale remote sensing image, facilitating storage management of image data.

The Hbase database table storage model is used to perform attribute expression for the zoned remote sensing image at a plurality of dimensions and realize data structure integration of multi-source heterogeneous remote sensing image data in a manner of data band discrete storage.

The Hbase database table storage model comprises one RowKey, one Time Stamp and two Columns Families.

The RowKey comprises 24 bytes, i.e. an ID (long 8 bytes) of a Google S2 grid, a satellite id (short 2 bytes), a sensor id (short 2 bytes), a photographing time stamp (long 8 bytes) of a remote sensing image and a unique ID (int 4 bytes) of a recording image.

PMS sensor Band1 data of Gaofen-1 satellite (GF1) was obtained at 10:00 AM on Jun. 12, 2013 with an image product number being 1212121. According to a RowKey encoding rule, if level-10 GoogleS2 slice corresponding to latitude and longitude of a center point of one slice is 11592267806 15630713, RS_GeoID=11592267806 15630713 12 21 2125 1212121.

The Columns Family comprises a Query Conditions Columns Family storing spatial information attributes of remote sensing images and a GEOimage information Columns Family recording image band and texture information.

The Query Conditions Columns Family comprises information such as a remote sensing image satellite production ID (productID), a product ID (sceneID), an image source name (FileName), an image source description xml name (XmlName), a source satellite (Satellite), a source sensor (Sensor), image photographing time (centerTime), a band name (band name), a grid level (grid level), a corresponding grid name (GridID), an image resolution (ImageResolution) and an image cloud amount (Cloud level).

The GEOimage information Columns Family comprises an image header information attribute field for describing image description recovery information and an image attribute field adjusted according to an actual image situation.

Figure 4:
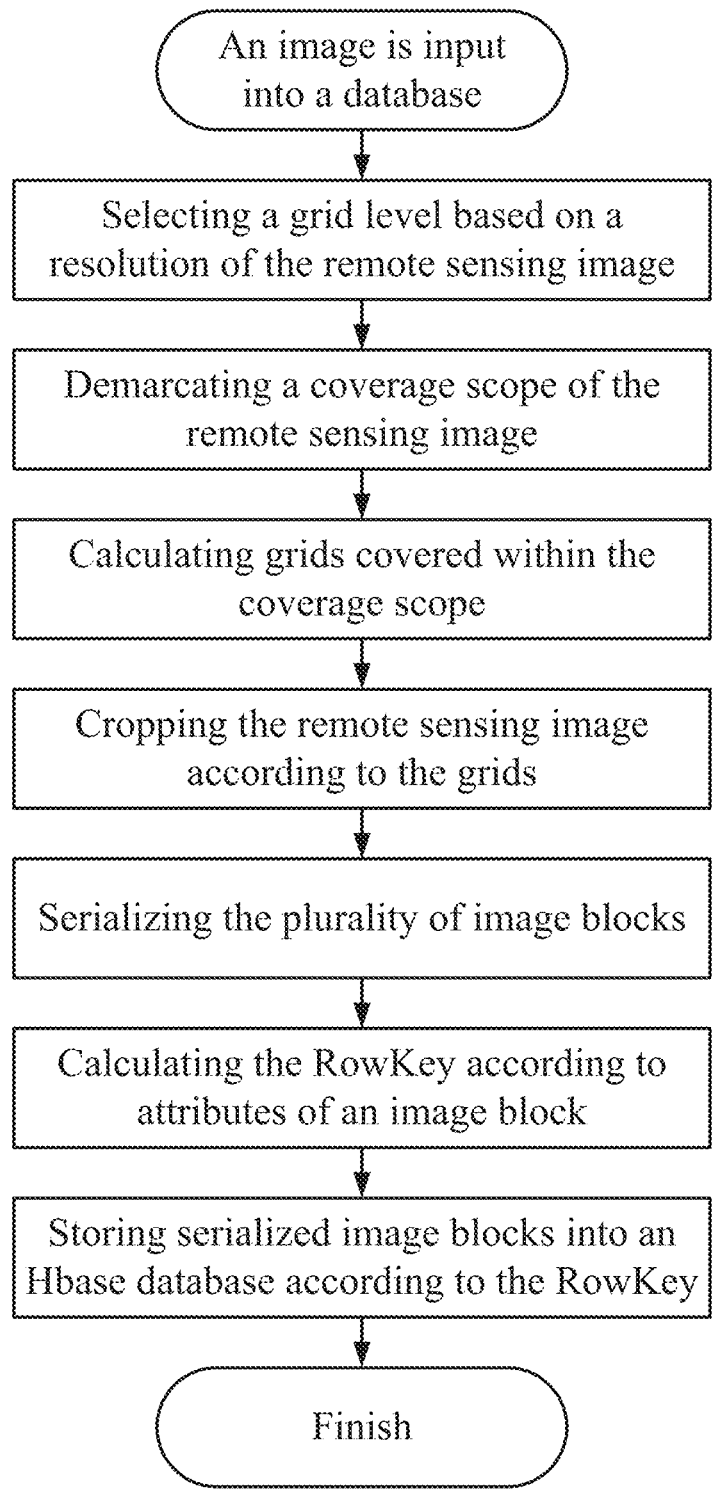
FIG. 4 is a flowchart illustrating a method of storing remote sensing big data in a Hbase database based on Google S2 algorithm according to one embodiment of the disclosure.

FIG. 4 is a flowchart illustrating a method of storing remote sensing big data in a Hbase database based on Google S2 algorithm according to an example of the disclosure. An example is described below.

An image is input into a database.

Mapping between multi-level grids of Google S2 and resolutions of different remote sensing images is performed for the loaded image. The corresponding Google S2 grid levels are selected according to the resolutions of the images. Table 1 shows the resolutions of some remote sensing images and their corresponding Google S2 grid levels.

The grids covered within an image scope are obtained according to a grid level and an image scope, and a maximum circumscribed rectangle of the grids is obtained. The circumscribed rectangle is used to prevent data from being lost from a seam of grids, thereby facilitating subsequent storage, recovery, splicing and analytical calculation of data.

According to the above results, the gridded cropping is realized for remote sensing data based on Google S2 to control a spatial uncertainty within a particular scope and form a regular polygon. Each polygon is referred to as a grid unit. In this way, a leveled and layered multi-level grid system is formed to realize ground spatial discretization and assign unified codes.

resolution of Landsat8 blue band is 30 m, and the slicing area obtained by performing Google S2 gridded cropping is 235.9296 km2; the resolution of Landsat7 Pan band is 15 m, and the slicing area obtained by performing Google S2 gridded cropping is 58.9824 km2; the resolution of GF1 blue band is 8 m, and the slicing area obtained by performing Google S2 gridded cropping is 16.777216 km2; the resolution of GF2 blue band is 4 m, and the slicing area obtained by performing Google S2 gridded cropping is 4.194604 km2; the resolution of GF1 Pan band is 2 m, and the slicing area obtained by performing Google S2 gridded cropping is 1.048576 km2; the resolution of GF2 Pan band is 1 m, and the slicing area obtained by performing Google S2 gridded cropping is 0.262144 km2.

The corresponding Google S2 grid number is assigned to the cropped and sliced image data.

Serialization conversion is performed for the cropped and sliced image. That is, the sliced data is deconstructed into a structural unit conforming to Hbase storage.

The cropped and sliced image data is divided into two categories, i.e., a spatial description information category and an image structure information category respectively according to its contained information.

The spatial description information category stores description information comprising but not limited to a remote sensing image satellite production ID (productID), a product ID (sceneID), an image source name (FileName), an image source description xml name (XmlName), a source satellite (Satellite), a source sensor (Sensor), image photographing time (centerTime), a band name (band name), a grid level (grid level), a corresponding grid name (GridID), an image resolution (ImageResolution), an image cloud amount (Cloud level), and the like. These information attributes describe the corresponding image data from different perspectives, and thus help the user to query data information from different dimensions.

The image structure category mainly comprises basic recovery information of image data comprising remote sensing image ontology information and relevant parameters such as a length, a width and a bit depth of image data, a source name, an affine transformation parameter, spatial projection information and band division setting. Since calculation is not performed by using all band data during calculation of remote sensing data, when an image data band matrix is stored, data in different band layers is stored in

TABLE 1

Corresponding table of remote sensing image resolutions and cropping levels

| Resolution of remote sensing images/m | Google S2 Level | S2 Area/km$^2$ | | | Example | |
|---|---|---|---|---|---|---|
| | | min | Avg | Max | Satellite | Slice Tile/km$^2$ |
| 60 | 9 | 194.6432 | 324.2913 | 408.1210 | Landsat7 (60 m) | 943.7184 |
| 30 | 10 | 48.6608 | 81.0728 | 102.0303 | Landsat8 (30 m) | 235.9296 |
| 10-20 | 11 | 12.1652 | 20.2682 | 25.5076 | Landast8 (15 m) | 58.9824 |
| 5-8 | 12 | 3.0413 | 5.0671 | 6.3769 | GF1(8 m) | 16.777216 |
| 3.5-4 | 13 | 0.7603 | 1.2667 | 1.5942 | GF2(4 m) | 4.194604 |
| 2-2.5 | 14 | 0.1901 | 0.3167 | 0.3986 | GF1(2 m) | 1.048576 |
| 1 | 15 | 0.0475 | 0.0792 | 0.0996 | GF2(1 m) | 0.262144 |

Table 1 shows existing data types in the database, comprising Landsat7 and Landsat8. The resolution of Landsat7 LWIR band is 60 m, and a slicing area obtained by performing Google S2 gridded cropping is 943.7184 km2; the different attribute columns and labeled by unique attribute identifiers. Such design may help the user to directly obtain desired band information when using the database and thus realize the most valuable push of data resources.

For the double Columns Family mode adopted in the design of the Hbase database table structure under requirements of the above idea, the Query Conditions Columns Family is used to record relevant information in the spatial description information category, and the GEOimage information Columns Family is used to record relevant information in the image structure information category.

Before the data is stored in the Hbase database, unique numbering is performed for to facilitate indexing the data. That is, it is required to establish a unique identifier RowKey of one row of HBase records according to the information such as a data source. A standardized structure of the RowKey is as follows: each RowKey is composed of 24 bytes, where eight bytes represent an ID of an S2 grid, eight bytes represent photographing time information of an image, two bytes represent a satellite ID, two bytes represent a sensor ID and four bytes represent a unique number of the image in this series of products.

The serialized image data is stored in the Hbase database according to the corresponding RowKey. The unique indexing of the blocked image data may be realized by using the above RowKey structure. Meanwhile, Hbase zoning standardization may be effectively controlled, and therefore controllability of subsequent optimization of the Hbase database is guaranteed.

After the blocked data is deconstructed to correspond to the unique RowKey, and then stored in the Hbase database to complete this storage management task of the data.

Figure 5:
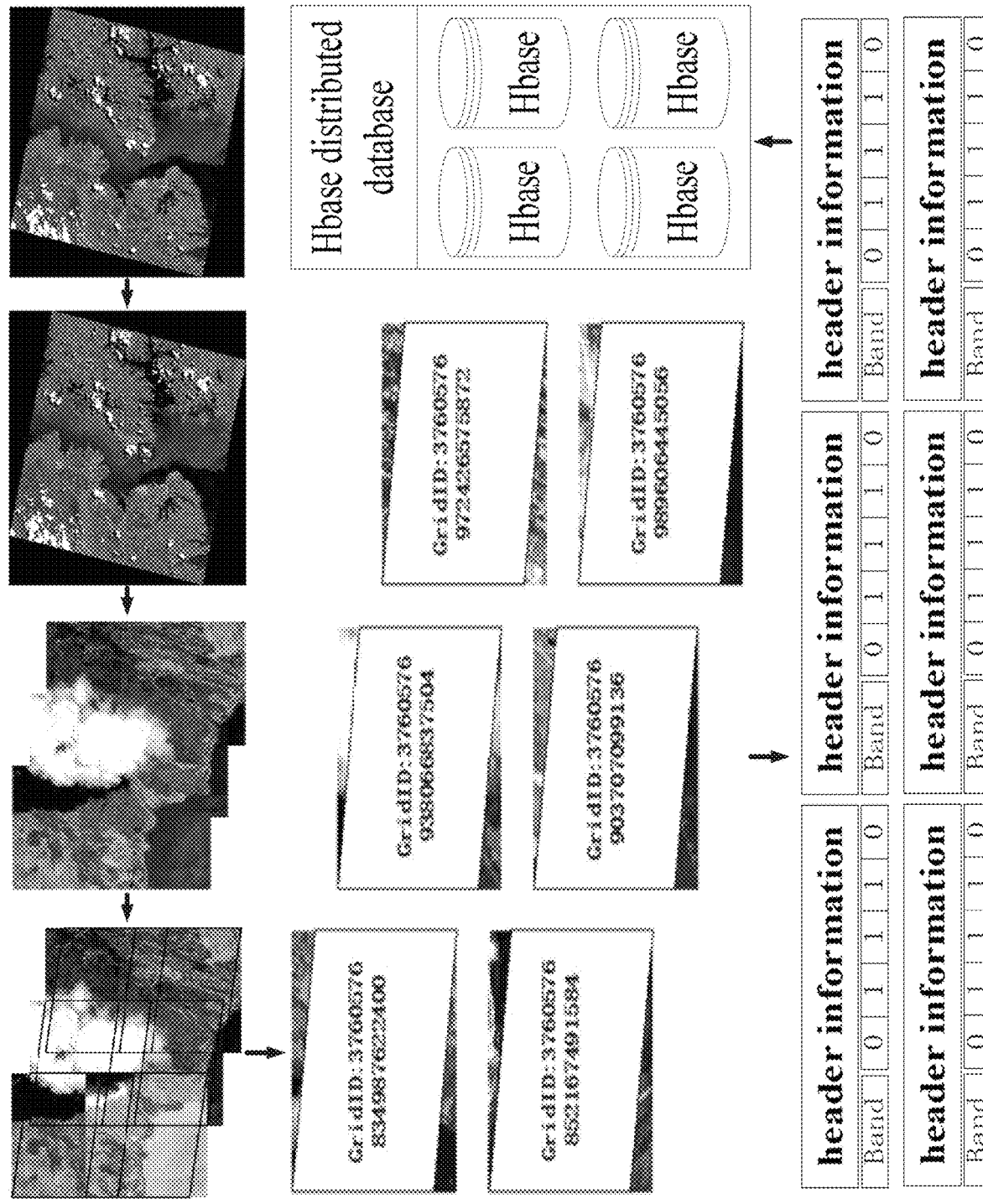
FIG. 5 is a flowchart of cropping a remote sensing image based on Google S2 algorithm according to the spatial resolution (2 m) of the remote sensing image of GF1.

FIG. 5 is a flowchart of cropping a remote sensing image based on Google S2 algorithm according to the spatial resolution (2 m) of the remote sensing image of GF1.

The data is one of the GF1, its name is GF1_PMS1_E116.1_N29.4_20160814_L1A0001760817-PAN1. For better explaining the patent, we use part of the data instead of the whole image to present the flow. We choose the center of the image. The flow is as follow: reading the received remote sensing image (GF1_PMS1_E116.1_N29.4_20160814_L1A 0001760817-PAN1) into the memory, and pre-cropping the remote sensing image based on a Google S2 algorithm; selecting the grid level(14) based on the spatial resolution (2 m) of the remote sensing image; determining the coverage range of the remote sensing image; calculating grids covered within the coverage range; cropping the remote sensing image according to the grids, to yield a plurality of image blocks, and serializing the plurality of image blocks; establishing a distributed Hbase cluster in the memory, which is responsible for the storage management of the block image; creating an image management library; establishing a table storage model containing RowKey; using the table storage model in the image management library; calculating the RowKey according to transformation of multiple key attributes of image block; and integrate multi-source remote sensing image data according to attribute expression of block remote sensing image in a plurality of dimensions in a manner of data band discrete storage, and store serialized image blocks in Hbase database table column cluster according to the RowKey.

Figure 6:
FIG. 6 is a flowchart of cropping a remote sensing image of Google S2 algorithm according to the spatial resolution (8 m) of the remote sensing image of GF1.

FIG. 6 is a flowchart of cropping a remote sensing image of Google S2 algorithm according to the spatial resolution (8 m) of the remote sensing image of GF1.

The data is one of the GF1, its name is GF1_PMS1_E116.1_N29.4_20160814_L1A0001760817-MSS1. For better explaining the patent, we use part of the data instead of the whole image to present the flow. We choose the center of the image. The flow is as follow: reading the received remote sensing image (GF1_PMS1_E116.1_N29.4_20160814_L1A0001760817-MSS1) into the memory, and pre-cropping the remote sensing image based on a Google S2 algorithm; selecting the grid level(12) based on the spatial resolution (8 m) of the remote sensing image; determining the coverage range of the remote sensing image; calculating grids covered within the coverage range; cropping the remote sensing image according to the grids, to yield a plurality of image blocks, and serializing the plurality of image blocks; establishing a distributed Hbase cluster in the memory, which is responsible for the storage management of the block image; creating an image management library; establishing a table storage model containing RowKey; using the table storage model in the image management library; calculating the RowKey according to transformation of multiple key attributes of image block; and integrate multi-source remote sensing image data according to attribute expression of block remote sensing image in a plurality of dimensions in a manner of data band discrete storage, and store serialized image blocks in Hbase database table column cluster according to the RowKey.

Figure 7:
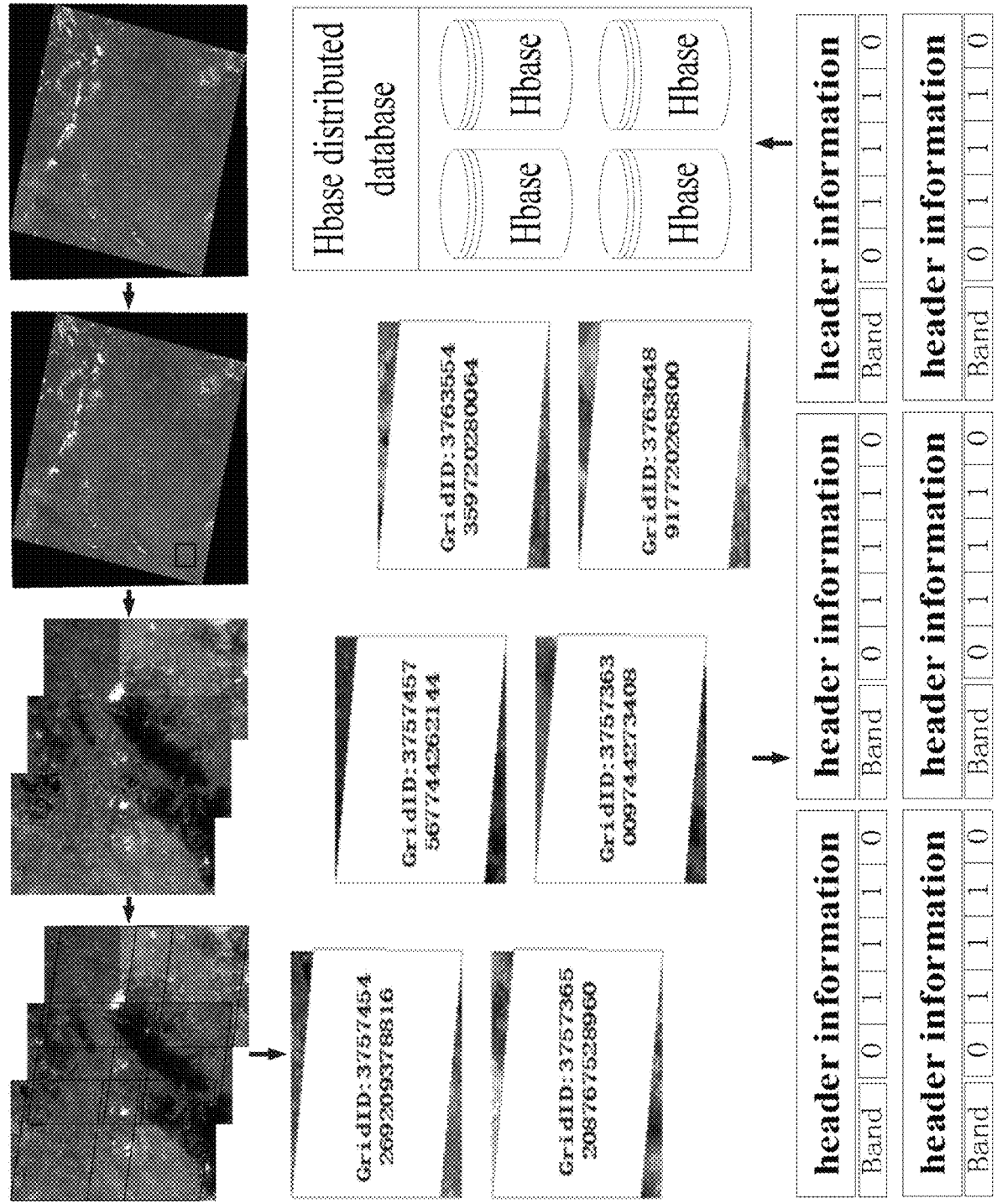
FIG. 7 is a flowchart of cropping a remote sensing image based on Google S2 algorithm according to the spatial resolution (15 m) of the remote sensing image of Landast8.

FIG. 7 is a flowchart of cropping a remote sensing image based on Google S2 algorithm according to the spatial resolution (15 m) of the remote sensing image of Landast8.

The data is one of the Landsat8, its name is LC81210402013134LGN03_B8. For better explaining the patent, we use part of the data instead of the whole image to present the flow. We choose the left lower corner of the image. The flow is as follow: reading the received remote sensing image(LC81210402013134LGN03_B8) into the memory, and pre-cropping the remote sensing image based on a Google S2 algorithm; selecting the grid level(11) based on the spatial resolution (15 m) of the remote sensing image; determining the coverage range of the remote sensing image; calculating grids covered within the coverage range; cropping the remote sensing image according to the grids, to yield a plurality of image blocks, and serializing the plurality of image blocks; establishing a distributed Hbase cluster in the memory, which is responsible for the storage management of the block image; creating an image management library; establishing a table storage model containing RowKey; using the table storage model in the image management library; calculating the RowKey according to transformation of multiple key attributes of image block; and integrate multi-source remote sensing image data according to attribute expression of block remote sensing image in a plurality of dimensions in a manner of data band discrete storage, and store serialized image blocks in Hbase database table column cluster according to the RowKey.

It will be obvious to those skilled in the art that changes and modifications may be made, and therefore, the aim in the appended claims is to cover all such changes and modifications.

What is claimed is:

1. A method executed by a computer processor, the method comprising:
  obtaining a remote sensing image, and pre-cropping the remote sensing image; selecting a grid level based on a resolution of the remote sensing image; demarcating a coverage scope of the remote sensing image; calculating grids covered within the coverage scope; cropping the remote sensing image according to the grids, to yield a plurality of image blocks, and serializing the plurality of image blocks; and
  establishing an distribution database table, wherein a plurality of remote sensing images acquired by one satellite corresponds to one distribution database table, and naming the distribution database table with a name of the one satellite and a corresponding sensor name; establishing a table storage model to store the serialized image blocks of the remote sensing image by using RowKey, and calculating the RowKey according to attributes of the image blocks; and integrating data structure of multi-source remote sensing image data according to attribute expression of a zoned remote sensing image in a plurality of dimensions in a manner of data band discrete storage, and storing the serialized image blocks in distribution database using the RowKey.

2. The method of claim 1, wherein
cropping the remote sensing image comprises mapping between multi-level grids and resolutions of different remote sensing images: when the resolution of the remote sensing image is 60 meters, a cropping grid level is level 9; when the resolution of the remote sensing image is 30 meters, a cropping grid level is level 10; when the resolution of the remote sensing image is in a range of 20-10 meters, a cropping grid level is level 11; when the resolution of the remote sensing image is in a range of 8-5 meters, a cropping grid level is level 12; when the resolution of the remote sensing image is in a range of 4-3.5 meters, a cropping grid level is level 13; when the resolution of the remote sensing image is in a range of 2.5-2 meters, a cropping grid level is level 14; when the resolution of the remote sensing image is 1 meter, a cropping grid level is level 15.

3. The method of claim 1, wherein the coverage scope of a cropped remote sensing image is decided as follows:
the coverage scope of a cropped remote sensing image is a maximum circumscribed rectangle of a diamond grid; the coverage scope of the maximum circumscribed rectangle is greater than a scope of the cropped diamond grid, so that a space of the cropped diamond grid is entirely filled with the cropped remote sensing image to ensure saturated filling of a pixel for the diamond grid and realize spatial discretization of the remote sensing image.

4. The method of claim 1, wherein the table storage model of the distribution database comprises one RowKey, one Time Stamp, and two Columns Families.

5. The method of claim 4, wherein the RowKey is configured to uniquely identify one row of records to realize positioning and expression of data.

6. The method of claim 5, wherein the RowKey comprises 24 bytes, first eight bytes of which represent an ID of the grids; next four bytes represent a satellite id, short 2 bytes, and a sensor id, short 2 bytes, respectively; further next eight bytes represent a photographing time stamp of the remote sensing image; last four remaining bytes record a unique ID of the remote sensing image; the Rowkey compiles the attributes into different bytes to realize unique expression of multi-source spatial blocked image data.

7. The method of claim 4, wherein two Columns Families comprise Query Conditions Columns Family and GEOimage information Columns Family, and unified management of different remote sensing data information and unique expression of multi-source spatial blocked image data are realized by freely controlling a Column attribute information amount in the Column Families.

8. The method of claim 7, wherein two groups of Column Family information in the two Columns Families are the Query Conditions Columns Family recording a spatial description condition and the GEOimage information Columns Family recording image band and texture information, respectively.

9. The method of claim 8, wherein attributes of the Query Conditions Columns Family comprise: a remote sensing image satellite production ID, a product ID, an image source name, an image source description xml name, a source satellite, a source sensor, image photographing time, a band name, a grid level, a corresponding grid name, an image resolution, an image cloud amount, which are used to describe spatial information in a plurality of dimensions.

10. The method of claim 8, wherein attributes of the GEOimage information Columns Family comprise image header information attribute fields for describing image description recovery information; image ontology information is recorded in different data attribute fields in a band division manner, and each band is stored by using an independent attribute field; the number of attribute fields recording images is adjusted according to different image data attributes.

11. A computing device executing the method of claim 1, the device comprising:
a processor, and a memory that comprises instructions that, when executed by the processor, cause the processor to perform acts comprising: reading the received remote sensing image into the memory, and pre-cropping the remote sensing image; selecting the grid level based on the resolution of the remote sensing image; determining the coverage range of the remote sensing image; calculating grids covered within the coverage range; cropping the remote sensing image according to the grids, to yield a plurality of image blocks, and serializing the plurality of image blocks; and
establishing a distributed database cluster in the memory, which is responsible for the storage management of the image blocks; creating an image management library; establishing a table storage model to store the serialized image blocks of the remote sensing image in the image management library by using RowKey, wherein the RowKey is calculated according to transformation of multiple key attributes of image blocks; and integrate multi-source remote sensing image data according to attribute expression of block remote sensing image in a plurality of dimensions in a manner of data band discrete storage, and store serialized image blocks in the distributed database cluster using the RowKey.

* * * * *